C. Joly.
Hydraulic Pump.
Nº 2,446. Patented Feb. 7, 1842.
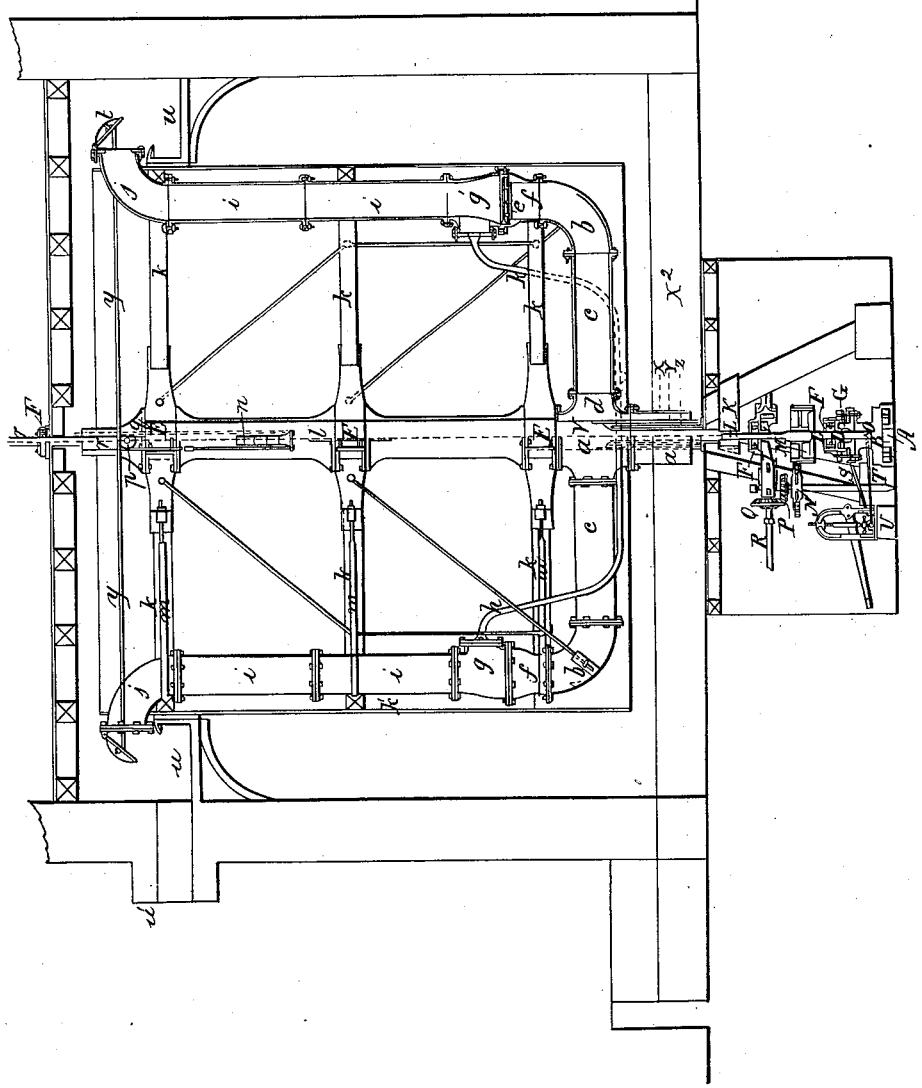

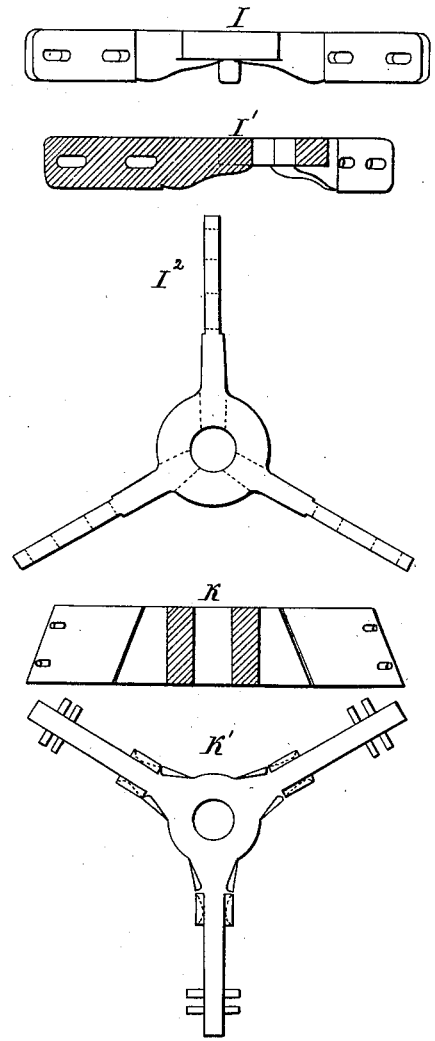
C. Joly.
Hydraulic Pump.
N° 2,446. Patented Feb. 7, 1842.
Sheet 2, 7 Sheets.

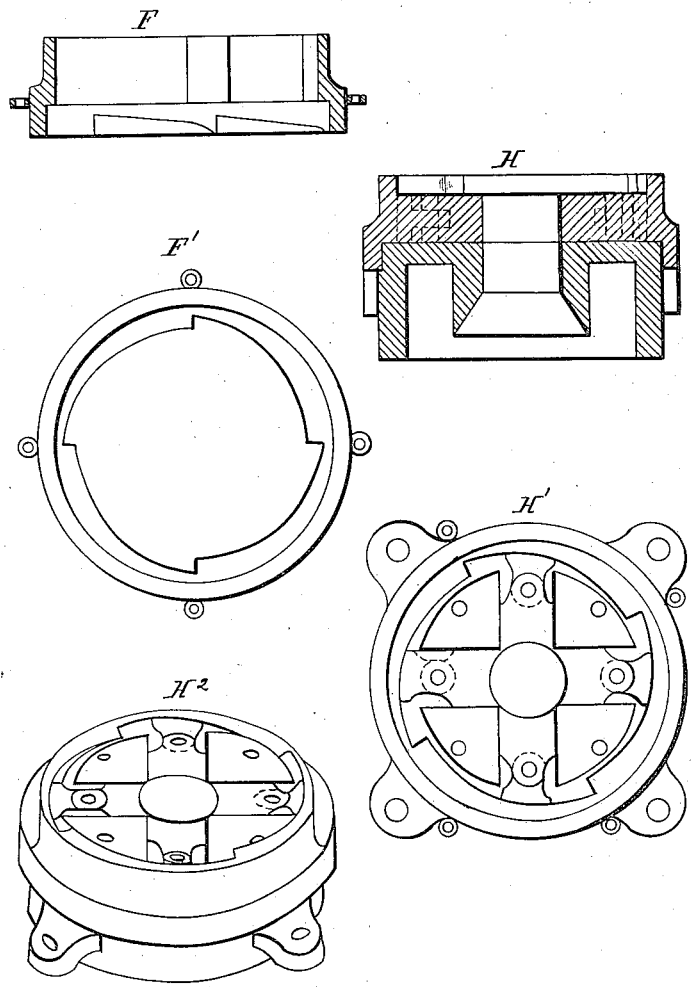

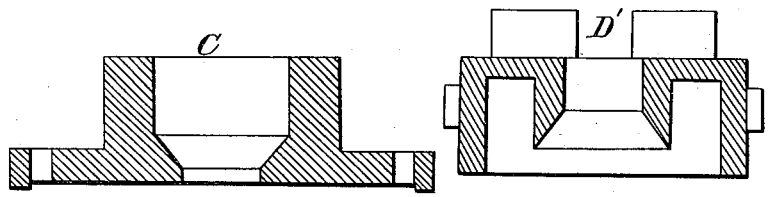
C. Joly.
Hydraulic Pump.
No 2,440.   Patented Feb. 7, 1842.
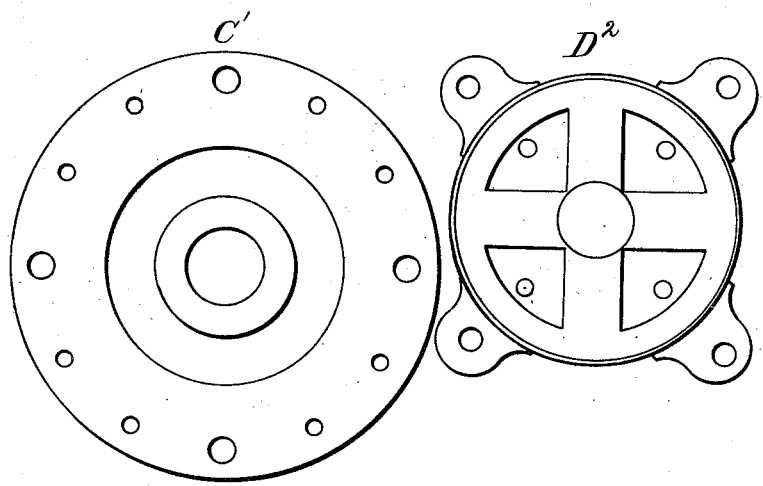
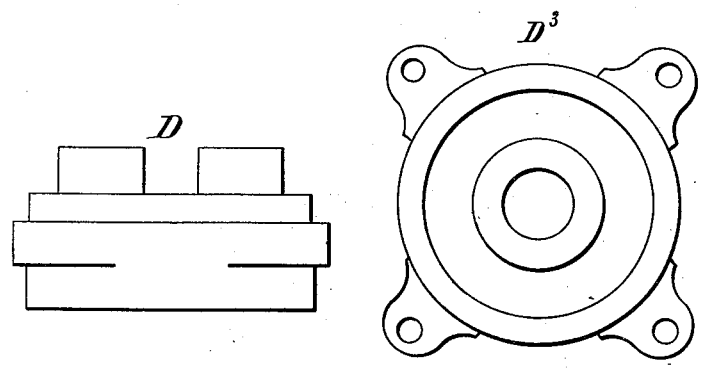

C. Joly.
Hydraulic Pump.
N° 2,446. Patented Feb. 7, 1842.
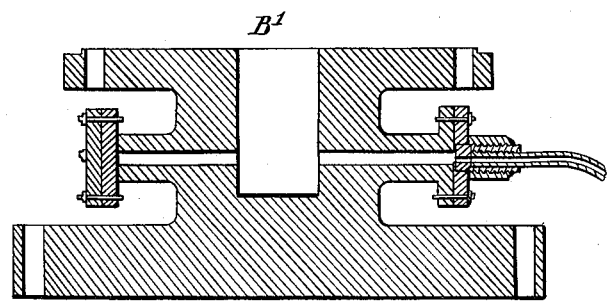
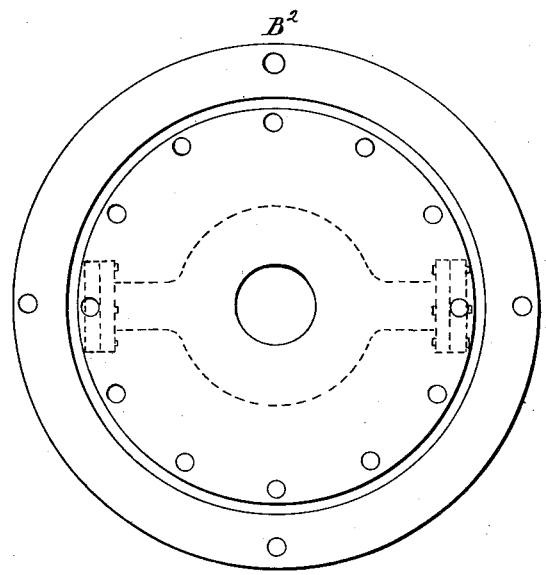
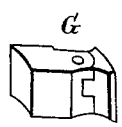
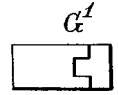
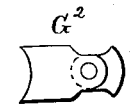

C. Joly.
Hydraulic Pump.
N° 2,446.   Patented Feb. 7, 1842.
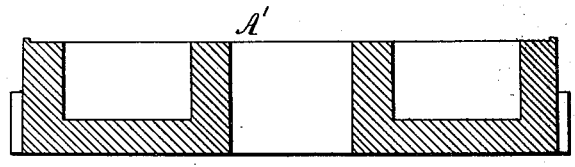
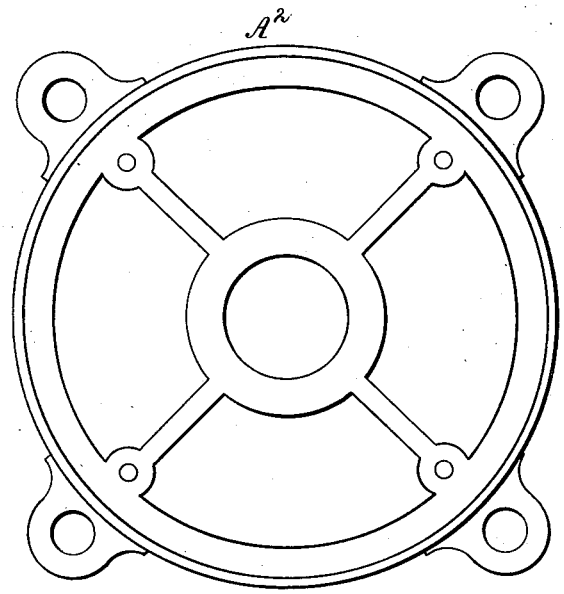
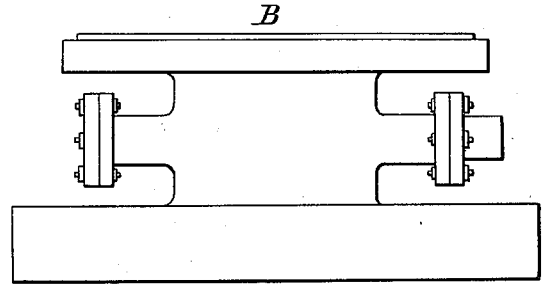

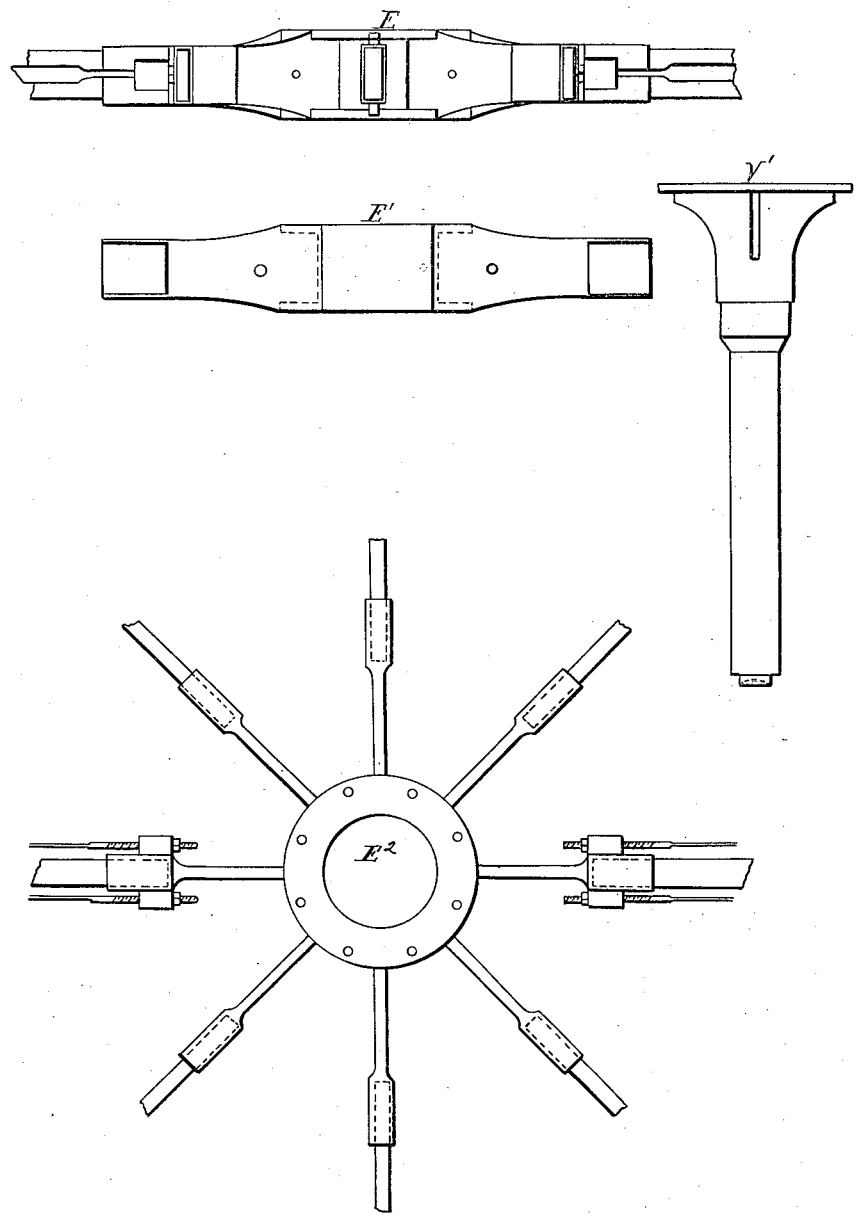

UNITED STATES PATENT OFFICE.

CHARLES JOLY, OF NEW YORK, N. Y.

CONSTRUCTION OF ADJUSTABLE BEARINGS OR BOXES FOR EMBRACING AND SUSTAINING THE SHAFTS OF WATER-WHEELS, &c.

Specification of Letters Patent No. 2,446, dated February 7, 1842.

*To all whom it may concern:*

Be it known that I, CHARLES JOLY, of the city of New York, in the State of New York, have made certain improvements in a machine for raising and for applying water to various useful purposes, which machine I denominate the "Reproductive hydraulic machine"; which consists of a combined centrifugal pump, and hydraulic step; and I do hereby declare that the following is a full and exact description thereof.

The part of my machine which is to be used for the raising of water from a cistern, or reservoir, is a modification of the apparatus known under the name of the centrifugal pump, which I have so improved as to cause it to operate with less friction than under any of the modes of construction heretofore adopted. The centrifugal pump may be varied in form, but that which I have given in Figure 1 of the accompanying drawings will serve to exemplify the action of my improved machine. In this figure, the left hand half of the drawing represents one half of the main vertical shaft, and one of the tubular horizontal and vertical arms through which the water is raised, as they appear externally; together with certain parts appended thereto; and the right hand half of the same figure represents them in a vertical section through their axes; there is a wall, or other firm structure, which may be built circularly upon a secure basis; and into the lower part of the circular space thus formed, the water which is to be raised is admitted from any convenient source, this water occupies the situation marked $X^2$. The water when raised by the centrifugal action of the machine, is to be delivered into a circular trough $u, u$, supported by the wall; at $u'$ there is a gate or opening allowing the water to escape from the circular trough for the purpose of being applied as a motive power to a wheel or other suitable apparatus.

At $d$, the tubes or pipes through which the water is to ascend are connected together, and from this part they may be said to form three branches; the mast $a$, a section of which is shown at X, rises vertically from the reservoir of water, into which its lower end opens; and the two portions $c, c$ proceed from it horizontally, and are connected by the curved elbows $b, b$, with the vertical pipes $i, i$; the curved portions $j, j$, attached to these, serve to deliver the water which is raised into the trough $u, u$. The capacity of the pipe $a'$ should be at least double that of either of those marked $c, c$ as it supplies both of them; this centrifugal pump is represented as composed of several sections. Between the sections $f f$ and $g, g$, there are valves at $e, e$ opening upward and allowing, when open, a free passage to the water. The respective sections are to be fastened together by means of flanches and screw bolts, or in any other convenient way.

$h, h,$ are tubes which enter the pipes $i, i,$ above the valves $e, e$; these tubes both connect with a single supply tube, and force pump, by which the tube $i, i,$ are to be filled prior to putting the machine into operation. A vertical shaft $l, l,$ rises from the tube $a,$ and has at its upper end a gudgeon $r, r,$ which is received, and runs within a suitable socket or box in the frame work of the machine.

$y, y,$ are cords attached to valves or shutters, which close the mouths of the tubes $I', I',$ when the machine is at rest, said cords passing over pulleys at P, and being acted on by a weight at $n$. At E, E, there are collars and flanches from which eight arms K, K proceed radially; two of these are made to sustain the tubes $i, i,$ and the whole of them extend out to a cylindrical case $k',$ $k',$ which is attached to, and revolves with, said pipes; said cylindrical case should be made very true, and with a polished surface to enable it to revolve with little friction from the air.

E, Plate 1, is a side view of two of these arms $k, k,$ E' a section through them, and $E^2$ a top view of the whole series. In these and in the other parts which are represented in detail and which will be presently described, variations may be made without altering the nature of the combination, or the principle of action in my machine; and I do not intend therefore to limit myself to the particular forms given, but present them only as exemplifications of the means which may be advantageously adopted for connecting the respective parts. I have already intimated that the form of the pipes $i', i'',$ may be varied; and they also may be increased in number if desired. The ascending pipe $a$ may for example, be extended up in the direction of the shaft $l, l,$ to the height to which the water is to be raised and those which deliver the water into the circular trough may branch off from it horizontally, at its upper end which will give to this part the form of the letter T, a form which has sometimes been given to them.

The main vertical shaft $l, l$ which may consist of a hollow pipe of cast-iron is connected to and rests upon, a solid shaft V, shown separately at V'; the two being united by means of flanches. The shaft V passes through the center of the tube $a$, and its lower end rests upon, and is coupled to the shaft L, L through which the first motion is to be communicated to the machine, in a manner to be presently explained. To prevent the escape of water from the reservoir, alongside of the shaft V a tube Z, attached to the bottom of the reservoir arises therefrom to a height above the surface of the water, and is surrounded by a tube Y attached to the revolving arms.

I will now proceed to describe the manner in which I construct the hydraulic step of my machine consisting of the lower gudgeon, and the box within which it runs. A, is a block, or support of cast iron; which may be formed as shown in section at A', and in top view at $A^2$ Plate 2.

B, is a stout cylindrical step, which receives the lower end of the shaft L L, constituting the lower gudgeon. This, in Fig. 1, is represented as resting upon a point $o$, but it is not to be so sustained when the machine is in action, but is to rest entirely upon a fluid; oil being preferred for that purpose. At B', Plate 2 this cylinder is shown in section.

B is a side, and $B^2$ a top view of it. This cylinder is surmounted by a stuffing box; C being its lower and D its upper part. These are shown enlarged in Plate 2 at C, C' and at D, D' and $D^2$.

U is a force pump from which oil is to be forced through the small tube T into the chamber of the cylinder B and this fluid being confined by the stuffing box will raise the shaft L and cause the whole weight of the superincumbent machinery to be sustained upon a bearing of oil alone; the portion of oil which percolates through the stuffing box may be conducted back again to the force pump by the tube S.

To sustain the shaft L, L and the shaft or gudgeon $r, r$, at the upper end of the main shaft, I surround them by adjustable bearings contained within suitable boxes at the points F, F, F. The manner in which I construct these boxes is fully represented at F G and H Plate 2.

G G and $G^2$ are sliding nuts constituting the bearing of the shaft, and which may be jointed, as represented, which are to be borne up against the shaft, and these are seen in place at H H', $H^2$; the section F, and these perspective view F', represents a rotating cap, which constitutes a part of these boxes H and is shown in place at H H', and $H^2$. By rotating the portion F it will be seen that the nuts G G will be regularly forced up by the four inclined curves on the inner side of said rotating cap. The upper box F Plate 1, is sustained on the frame work above the centrifugal revolving arms. The upper one on the shaft L is supported upon an iron bench, or standard, I, I, attached to the frame work under the reservoir of the machine, and this is shown enlarged at I I' $I^2$, Plate 2, as having three branches by which to attach it; the form of this particular may of course, be varied at pleasure to suit that of the frame work.

K, K' is a second support of iron, with three branches also by which to attach it to the frame; and this serves to support the machine when not in motion. The shaft L, L, may have a range of five or six inches, vertical play, resulting from the varying quantity of fluid forced in under it, although a height of half an inch, or less, of oil will be as effective as a larger quantity.

At B', Plate 2, two tubes are represented as entering the chamber of the cylinder; one of these is for the supply of oil, the other may lead to a manometer, and indicate the total pressure of the machine. Upon the shaft L, L there is a toothed wheel M, having a wide rim, say of eight or ten inches in width, to allow of its vertical play. Into this gears a wheel N on a vertical shaft, carrying also a bevel wheel P; into which latter the bevel wheel Q on the horizontal shaft R engages. When from peculiar circumstances the apparatus just described cannot be allowed the requisite space below the reservoir the oil pump may be elevated to the level of the reservoir, and the cylinder B constituting the step of the machine, may be placed within the reservoir itself, the other parts being adapted to this arrangement; the manner of doing which will be readily perceived by every competent machinist.

When the machine is to be set into operation the pipes $i, i$, are to be first filled with water which may be done through the tubes $h, h$, and oil is also to be forced into the cylinder B. Motion is then to be communicated to the centrifugal pump by any extraneous power applied to the shaft R, until it has acquired sufficient velocity to cause the water to rise freely into the trough $u, u$. This water upon being allowed to escape at the gate $u'$ may be made to turn a bucket wheel and the power thus generated may be applied in any way which may be found available.

Having thus fully described the nature of my invention, and shown the manner in which the same is to be carried into operation I do hereby declare that I do not claim the centrifugal pump as of my invention this having been long known and used but What I do claim is—

The particular manner of constructing the adjustable bearings, or boxes for embracing and sustaining the shafts, such boxes, or bearings consisting of the main box for receiving the sliding nuts, the sliding nuts and the rotating cap, with its inclined curves, arranged and operating as set forth.

CHS. JOLY.

Witnesses:
JAS. LE BOUTILLIER,
JOS. RAMIE.